United States Patent [19]

Massengale et al.

[11] Patent Number: 5,686,521
[45] Date of Patent: Nov. 11, 1997

[54] MILLED CARBON FIBER REINFORCED POLYMER COMPOSITION

[75] Inventors: Brian Massengale; Paul Schauer, both of Colorado Springs; Charles Dahle, Woodland Park; Barry Gregerson, Colorado Springs; Bonnie Bachman, Boulder; Thomas Oesterle, Colorado Springs, all of Colo.

[73] Assignee: Empak, Inc., Chanhassen, Minn.

[21] Appl. No.: 636,724

[22] Filed: Apr. 23, 1996

Related U.S. Application Data

[63] Continuation of Ser. No. 312,470, Sep. 26, 1994, abandoned.
[51] Int. Cl.[6] .................... C08J 5/10; C08K 3/04; C08L 23/12
[52] U.S. Cl. .................. 524/496; 524/495; 525/178; 525/184; 525/199; 525/420
[58] Field of Search .................... 525/178, 184, 525/199, 420; 524/495, 496

[56] References Cited

U.S. PATENT DOCUMENTS

| | | | |
|---|---|---|---|
| 4,574,950 | 3/1986 | Koe et al. | 206/334 |
| 4,758,651 | 7/1988 | Sikkema | 528/329.1 |
| 4,833,005 | 5/1989 | Klaar et al. | 428/224 |
| 5,057,600 | 10/1991 | Beck et al. | 528/480 |
| 5,075,392 | 12/1991 | Harris et al. | 525/420 |
| 5,079,281 | 1/1992 | Takeuchi et al. | 523/212 |
| 5,131,818 | 7/1992 | Wittkop et al. | 417/273 |
| 5,149,584 | 9/1992 | Baker et al. | 428/297 |
| 5,151,489 | 9/1992 | Harris et al. | 528/183 |
| 5,154,301 | 10/1992 | Kos | 211/41 |
| 5,162,157 | 11/1992 | Tanaka et al. | 428/549 |
| 5,177,158 | 1/1993 | Noma | 525/420 |
| 5,182,166 | 1/1993 | Burton et al. | 428/368 |
| 5,198,281 | 3/1993 | Muzzy et al. | 428/102 |
| 5,227,238 | 7/1993 | Hirai et al. | 428/367 |
| 5,247,017 | 9/1993 | Noma | 525/133 |
| 5,264,274 | 11/1993 | Shigeta et al. | 428/284 |
| 5,283,284 | 2/1994 | Brooks et al. | 525/179 |

*Primary Examiner*—Vasu S. Jagannathan
*Assistant Examiner*—U. K. Rajguru
*Attorney, Agent, or Firm*—Haugen and Nikolai, P.A.

[57] ABSTRACT

A milled carbon fiber reinforced polymer having increased abrasion resistive characteristics. The reinforced polymer comprises a base resin selected from the group consisting of polyolefins and polyamides. The base resin is combined with an amount of milled carbon fibers and further may be combined with polytetrafluoroethylene. The resulting composite materials have excellent friction and wear characteristics and are useful in the production of injection molded parts. The molded parts have a high impact strength, exhibit dimensional stability, are abrasion resistive, and are static dissipative, with the composite materials having particular utility as support fixtures for semiconductors during certain processing operations.

8 Claims, No Drawings

MILLED CARBON FIBER REINFORCED POLYMER COMPOSITION

This is a Continuation of application Ser. No. 08/312,470, filed on Sep. 26, 1994, now abandoned.

BACKGROUND OF THE INVENTION

I. Field of the Invention

The present invention relates generally to a fiber reinforced polymer and articles fabricated therefrom, and more particularly, it relates to a high temperature thermoplastic polymer, reinforced with milled carbon fibers. The composition has increased abrasion resistance, and which also dissipates static. The composition has desirable mechanical and physical properties, including excellent friction and wear characteristics, as well as low outgassing, thereby rendering the composition useful for the production of certain injection molded parts.

II. Discussion of the Related Art

In the past, various wear resistive polymeric compositions have been used for production of injection molded parts. One particular field of use of the wear resistive compounds includes certain devices used in the processing of semiconductor wafers. These devices include semiconductor wafer cassettes, semiconductor wafer transport boxes, and other related devices. These devices may be molded from wear resistive polymer compounds, since surfaces of these devices are subjected to abrasion during processing, transportation and storage. When a surface of one of these devices contacts another surface, abrasion occurs. Hence, there is an increased likelihood that particulate will be released from the abraded surface.

The production of semiconductor wafers requires an exceptionally clean environment, free of contaminants such as abraded particulate and also requires the utilization of materials having low outgassing, thus reducing film build-up on the surface the wafers. The presence of any small particles, vapors or static discharge in the environment impairs the production of semiconductors, including the wafers themselves. In an effort to combat or reduce airborne particle problems, wear resistive polymers are used to reduce the amount of abraded particulate created in the various operations.

To protect the semiconductor wafers from damage due to build-up of static charge and to reduce the attraction of airborne particles due to static charge, the industry manufactures SEMI (Semiconductor Equipment and Materials International) standard wafer carriers and SMIF (Standardized Mechanical InterFace) pods and boxes from a carbon powder filled polypropylene. The surface resistivity of the carbon powder filled copolymer is typically $10^5$–$10^9$ ohms/cm$^2$, with this resistivity value reducing the attraction of airborne particulate. However, devices molded with carbon powder filled polypropylene have been found to shed tiny particles when subjected to abrasion. These abraded particles present a risk, during processing, of damaging the processing equipment and the semiconductor wafers. Therefore, there is a need for an improved abrasion resistive polymer that may be used to manufacture devices meeting SEMI standards and other devices used in the semiconductor wafer manufacturing process.

The Tanaka et al., U.S. Pat. No. 5,162,157 discloses a composite material used to manufacture plane bearing or self lubricating items. The Tanaka material contains 5–30% by volume metal lead, 5.5–50% by volume filler material, and the remainder being polytetrafluoroethylene (PTFE). Tanaka recognized carbon fiber as a suitable filler. The composite material was noted for improving the friction and wear characteristics of devices manufactured from the material. The composite material was impregnated onto a backing metal and subjected to heat to form a sliding surface on the backing metal. The disclosed composite material does not have a surface resistivity of $10^5$–$10^9$ ohms/cm$^2$. Therefore, the particulate released from abrasion would be attracted to a device molded from Tanaka's composite material. As a result, the composite material is not advantageous for use in semiconductor wafer devices used in the processing of semiconductor wafers. Further, when used in the injection molding process, there is inconsistent flow and shrinkage, thereby causing warpage in the molded device. Therefore, there is a need for a composite material having a surface resistivity between $10^5$ ohms/cm$^2$ and $10^9$ ohms/cm$^2$ that may be useful in an injection molding process to produce consistent parts.

The Takeuchi et al U.S. Pat. No. 5,079,281 discloses a composite material consisting of: polypropylene, a carboxyl group, saline treated reinforcing fibers and coloring. The carboxyl group contains polypropylene combined by graft polymerization. The Takeuchi composite material uses carbon fibers for increased strength. Typically, the carbon fiber retards shrinkage of the part in the direction of flow during the injection molding process. However, in the cross flow direction the carbon fibers do not retard shrinkage. Hence, differential shrinkage creates or exaggerates warpage and reduces dimensional consistency in the parts. Therefore, a need exists for a material that may be used in the injection molding process that has a surface resistivity of $10^5$–$10^9$ ohms/cm$^2$, does not release particulate when abraded, and does not warp during molding.

The present invention overcomes the disadvantages of the related composite materials by providing a reinforced polymer having low abrasion characteristics and also low outgassing of articles fabricated therefrom. The composite material also has a high surface resistivity in the range of $10^5$–$10^9$ ohms/cm$^2$, thereby providing a material suitable for use in the production of devices used in the semiconductor wafer production process. Further, the unique composite material provides consistent injection molded parts.

SUMMARY OF THE INVENTION

The primary purpose of the present invention is to provide a reinforced polymer or composite material having a surface resistivity between $10^5$ and $10^9$ ohms/cm$^2$, whereby a decreased amount of particulate is released when the reinforced polymer is subjected to abrasion. The polymer consists of a base resin selected from the group consisting of polyolefins and polyamides. Milled carbon fibers (MCF) are added to the base resin as a reinforcing filler. The use of the MCF rather than other reinforcing filler helps reduce inconsistent part shrinkage in both the flow and cross flow directions during the injection molding process. When the composition of the present invention is employed for application in the semiconductor processing field, such as for the preparation of semiconductor wafer casettes and/or wafer transport boxes, it is preferable that milled carbon fibers of high purity be employed. Such fibers are, of course, readily commercially available.

The addition of MCF results in a reinforced polymer that has increased resistance to abrasion. To further reduce the amount of released abraded particulate, polytetrafluoroethylene (PTFE) powder may be added to the composite material. The PTFE powder is known for its chemical resistance plus lubricity and toughness. By including the PTFE in the composite material, the MCF are more tightly held when subjected to abrasion. The PTFE powder (spheres or beads) also creates a smooth, slippery surface. The smooth, slippery surface further reduces the amount of released abraded particulate.

While the present invention may utilize polyolefins or polyamides as base resins, those skilled in the art will recognize that polypropylene (PP) or polypropylene homopolymer (PPHP), polyetheretherketone (PEEK), and polyphthalamide (PPA) are particularly useful as base resins for use in injection molding devices used in the processing of semiconductor wafers. Without limitation, the invention will be explained in the context of the utility of PP, PEEK, and PPA as base resins used to mold semiconductor wafer processing devices. Those skilled in the art will appreciate that certain other polyolefins and polyamides may be used as base resins for use in devices that require a reinforced abrasion resistive polymer with dielectric properties of $10^5$–$10^9$ ohms/cm$^2$ and a consistant shrink factor for injection molding.

It is accordingly a principle object of the present invention to provide a MCF reinforced polymer that may be used in the injection molding process to produce consistent molded devices having a surface resistivity between $10^5$–$10^9$ ohms/cm$^2$ to aid in static dissipation and minimize static discharge.

Another object of the present invention is to provide a reinforced composite material which minimizes the amount of the particulate shed when subject to abrasion.

Still another object of the present invention is to provide a reinforced composite material which exhibits minimal amounts of warping during the injection molding process.

Yet another object of the present invention is to provide a reinforced composite material which may be used to mold devices used in processing semiconductor wafers, wherein the molded devices have a resistivity of $10^5$–$10^9$ ohms/cm$^2$ and a reduced amount of abrasion and shedding of tiny particles when subject to an abrasive surface.

These and other objects, as well as these and other features and advantages of the present invention, will be readily apparent to those skilled in the art from a review of the following detailed description of the preferred embodiment.

DETAILED DESCRIPTION OF THE PREFERRED EMBODIMENT

The reinforced polymer or composite material of the present invention consists of an amount of a homopolymer base resin and an amount of pure milled carbon fibers (MCF). The base resin is selected from a group consisting of polyolefins and polyamides. In the preferred embodiment the composite material contains the base resin in an amount between 66–81% by weight of the working composite material. The resulting reinforced polymer releases less particulate when abraded, compared to other reinforced polymers. The reinforced polymer also has consistent part shrinkage in both the flow and cross flow directions during injection molding. The composite material may also consist of an amount of polytetrafluoroethylene (PTFE) powder. The inclusion of PTFE powder further reduces the amount of released abraded particulate. In the preferred embodiment, an amount of PTFE between 8% to 10% by weight of the working composite material is combined with the base resin and MCF.

The MCF have an average fiber length of less than about 0.010 inches and a diameter of between 0.0007 and 0.0009 inches. The size and length of the MCF allows the base resin to freely flow around the MCF during the injection molding process. The MCF retards shrinkage of the part consistently along both the flow axis and cross-flow axis during the injection molding process. Hence, the molded parts are dimensionally consistent, without exaggerated warp.

During the manufacture of some MCF, contaminants may typically be intermixed with the MCF. Those skilled in the art will appreciate that the use of pure MCF increases the dimensional consistency of the molded parts. The MCF reinforces the selected base resin by "knitting" with the resinous mass. The surface of a part molded from the knitted resin does not release as much particulate, when its surface is abraded. The amount of MCF also affects the surface resistivity of the composite material. As expected, the surface resistivity decreases as the amount of included MCF is increased. In the preferred embodiment, the amount of MCF is between 19–34% by weight of the working composite material.

While the present invention may utilize polyolefins or polyamides as base resins, those skilled in the art will recognize that polypropylene (PP), polyetheretherketone (PEEK), and polyphthalamide (PPA) are particularly useful as base resins for use in injection molding devices used in the processing of semiconductor wafers. The use of PP, PPA, or PEEK as a base resin combined with MCF produces a composite material having a surface resistivity between $10^5$–$10^9$ ohms/cm$^2$, which is also resistive to surface abrasion. PPA is a high temperature, high performance semi-crystalline thermoplastic polymer. PPA is produced under the tradename "Amodel" and is commercially available from Amoco Performance Products, Inc. of Chicago, Ill. PEEK is also a high temperature, high performance thermoplastic polymer that is available from E. I. DuPont de Nemours & Co., Inc. of Wilmington, Del.

Those skilled in the art will appreciate that the base resins PP, PPA and PEEK, selected from the group of polyamides and polyolefins, all exhibit the following characteristics: high temperature stability, good dimensional stability, good wear and friction properties, good flow characteristics for injection molding. These common properties make any of these homopolymer a suitable base resin for use in injection molding parts for use in the processing of semiconductor wafers.

EXAMPLES

Examples of the present invention will be described below. An amount of the base resins PP, PPA, and PEEK were individually combined with an amount of MCF. An amount of the base resins PP, PPA, and PEEK were also individually combined with an amount of MCF and an amount of PTFE. Generally, polypropylene homopolymers (PPHP) were employed, with such materials being commercially available. The data detailing the properties of these composite materials is represented in Tables 1 and 2. The testing method for all the property data is in accordance with the American Society for Testing Materials (ASTM). ASTM is a scientific and technical organization which establishes standardized tests, thereby ensuring that the property data represented for tested compositions is uniform.

The flow characteristics of the composite materials indicate whether the materials have high temperature stability. The flow characteristics affect the dimensional stability of injection molded parts. The ability to mold thin wall sections having low flash and dimensional stability are also affected by the flow characteristics of the composite material. The melt flow of each composite material is included in Tables 1 and 2. Tables 3 and 4 demonstrate the heat properties of the composite materials. The heat properties of the composite materials are also important to the injection molding process. DSC testing (Differential Scanning Calorimetry which measures thermal activity of a compound over a given temperature range by recording a sample's heat absorption or emission during a heating or cooling process) demonstrates the heat properties of each composite material. The peak maximum, the peak onset, and the heat of fusion for each composite material are included in Tables 3 and 4.

When the composite materials are being utilized in semiconductor production applications, it may be desirable to conduct a typical outgassing operation on the bulk material prior to molding. Outgassing may be undertaken as a post-cure operation as well. Normal conditions and operational paremeters are employed for the outgassing operations, which allows organic, inorganic and heavy metal impurities to bleed from the composite material. Tables 1–6 demonstrate the various properties of test materials.

EXAMPLE I

A polypropylene base resin was blended with high purity MCF fibers, with the fibers comprising 30% by weight of the working composite material, balance of 70% polypropylene. The MCF material had an average fiber length of about 0.01 inches and an average fiber diameter of 0.0008 inches. Following blending, the composite material was subjected to a conventional plastic injection molding operation to prepare sample composite parts. The blended composite material flows well during molding, and does not require unusual, special, or exceptional steps or equipment to accomplish and complete the molding operation.

The reinforced polymer has been found to possess increased resistivity to abrasion. Data from abrasion tests on the various composite materials of the type described in Example I are detailed in Tables 5 and 6. A 1 kg. weight was positioned above a 1 cm thick piece of the composite material. The total abraded surface was approximately 0.8 $cm^2$. The composite material was then rotated on a stainless steel table in a 2.5 ft. circumference. After 500 rotation cycles, the stainless steel table was cleaned and the composite material was weighed. A total of 5,000 cycles were performed on each composite material. The change in weight, over 500 cycles, of the composite material was then normalized for the entire test.

EXAMPLE II

A polyphthalamide resin was blended with MCF fibers, with the fibers comprising 30% by weight of the working composite material, balance of 70% polyphthalamide. The MCF material had an average fiber length of about 0.01 inches and an average fiber diameter of 0.0008 inches. Following blending, the composite material was subjected to a molding operation to prepare sample composite parts. The blended composite material flows well during molding, and does not require unusual, special, or exceptional steps or equipment to accomplish and complete the molding operation.

EXAMPLE III

A polyetheretherketone base resin was blended with MCF fibers, with the fibers comprising 22% by weight of the working composite material, balance of 78% polyetheretherketone. The MCF material had an average fiber length of about 0.01 inches and an average fiber diameter of 0.0008 inches. Following blending, the composite material was subjected to a molding operation to prepare sample composite parts. The blended composite material flows well during molding, and does not require unusual, special, or exceptional steps or equipment to accomplish and complete the molding operation.

The properties of test samples prepared in accordance with Examples I, II and III are such that the results are encouraging, with the results being set forth generally in Tables 1–6 hereinbelow. In addition, articles molded from this composite material demonstrated excellent properties when the composite material had been subjected to outgassing prior to molding.

TABLE I

PROPERTY DATA

| | Units | Test Method | Example 1 (test 1) | Example 2 (test 2) | Example 3 (test 3) | Example 4 (test 4) | Example 5 (test 5) |
| --- | --- | --- | --- | --- | --- | --- | --- |
| % PPHP | % | — | 75 | 72.5 | 66 | 75 | 62.5 |
| % PPA | % | — | — | — | — | — | — |
| % PEEK | % | — | — | — | — | — | — |
| % MCF | % | — | 25 | 27.5 | 34 | — | — |
| % CF | % | — | — | — | — | 25 | 27.5 |
| % PTFE | % | — | — | — | — | — | 10 |
| Tensile Strength | PSI | ASTM D-238 | 7,674 | 7,684 | 8,305 | 8,958 | 7,400 |
| Tensile Elongation | % | ASTM D-238 | 2.0 | 2.0 | 1.01 | 0.6 | 3.4 |
| Tensile Modulus | PSI (×10$^6$) | ASTM D-238 | 1.05 | 0.97 | 2.07 | 1.82 | 1.25 |
| Flexural Strength | PSI | ASTM D-790 | 11,213 | 11,471 | 12,755 | 13,430 | 12,300 |
| Flexural Modulus | PSI (×10$^6$) | ASTM D-790 | 1.04 | 1.17 | 1.59 | 1.57 | 1.06 |
| Rockwell Hardness | R Scale | ASTM D-785 | 112 | 112 | 112 | 115 | 102 |
| Deflection Temp. @ 264 | °C. | ASTM D-648 | 138 | 142 | 146 | 138 | 143 |
| Deflection Temp. @ 66 | °C. | ASTM D-648 | 159 | 159 | 161 | 157 | 160 |

TABLE I-continued

PROPERTY DATA

|  | Units | Test Method | Example 1 (test 1) | Example 2 (test 2) | Example 3 (test 3) | Example 4 (test 4) | Example 5 (test 5) |
|---|---|---|---|---|---|---|---|
| IZOD Impact Notched | ft-lb/in | ASTM D-256 | 0.6 | 0.6 | 0.7 | 0.7 | 0.8 |
| IZOD Impact Unnotched | ft-lb/in | ASTM D-256 | 3.3 | 2.8 | 3.2 | 3 | 5.8 |
| Specific Gravity | — | ASTM D-792 | 1.02 | 1.04 | 1.09 | 1.02 | 1.13 |
| Melt Flow | gm/10 min | ASTM D-1286 | 12.5 | 11.7 | 8.5 | 3.4 | $9.5 \pm 0.5$ |
| Mold Shrinkage | in/in | ASTM D-955 | 0.003 | 0.003 | 0.0015 | 0.0008 | 0.017 |
| Surface Resist. | ohms/cm$^2$ | Voyager SRN | $10^6$ | $10^5$ | $10^5$ | $10^5$ | $10^7$ |
| Volume Resist. | ohms-cm | ASTM D-257 | 26 | 26 | 3 | 0.6 | $1.4 \times 10^3$ |
| Static Decay (+5 KV-5 KV) | sec. | Mil. 8-81705 C | <2 | <2 | <2 | <2 | .01 |

TABLE 2

|  | Units | Test Method | Example 6 (test 6) | Example 7 (test 7) | Example 8 (test 8) | Example 9 (test 9) |
|---|---|---|---|---|---|---|
| % PPHP | % | — | — | — | — | — |
| % PPA | % | — | 71 | 61 | — | — |
| % PEEK | % | — | — | — | 78 | 68 |
| % MCF | % | — | 29 | 29 | 22 | 22 |
| % CF | % | — | — | — | — | — |
| % PTFE | % | — | — | 10 | — | 10 |
| Tensile Strength | PSI | ASTM D-238 | 16,218 | 16,963 | 18,892 | 14,570 |
| Tensile Elongation | % | ASTM D-238 | 0.9 | 0.9 | 1.5 | 1.0 |
| Tensile Modulus | PSI ($\times 10^6$) | ASTM D-238 | 2.20 | 2.41 | 1.79 | 1.88 |
| Flexural Strength | PSI | ASTM D-790 | 25,481 | 26,277 | 28,643 | 21,797 |
| Flexural Modulus | PSI ($\times 10^6$) | ASTM D-790 | 2.01 | 2.16 | 1.56 | 1.66 |
| Rockwell Hardness | R Scale | ASTM D-785 | 125 | 123 | 124 | 117 |
| Deflection Temp. @ 264 | °C. | ASTM D-648 | 262 | 263 | 280+ | 280+ |
| Deflection Temp. @ 66 | °C. | ASTM D-648 | 277 | 277 | 280+ | 280+ |
| IZOD Impact Notched | ft-in/in | ASTM D-256 | 0.7 | 0.6 | 0.9 | 0.9 |
| IZOD Impact Unnotched | ft-lb/in | ASTM D-256 | 3.4 | 3.9 | 6.6 | 4.4 |
| Specific Gravity | — | ASTM D-792 | 1.32 | 1.39 | 1.37 | 1.43 |
| Melt Flow | gm/10 min | ASTM D-1286 | 3.5 | 3.0 | 17.7 | 7.1 |
| Mold Shrinkage | in/in | ASTM D-955 | 0.0027 | 0.0013 | 0.0028 | 0.0018 |
| Surface Resistivity | ohms/cm$^2$ | Voyager SRN | $10^5$ | $10^5$ | $10^6$ | $10^6$ |
| Volume Resistivity | ohms-cm | ASTM-257 | $5.4 \times 10^2$ | $8.4 \times 10^2$ | $1.4 \times 10^4$ | $1.5 \times 10^4$ |
| Static Decay (+5 KV-5 KV) | sec. | Mil. 8-81705 C | <2 | <2 | <2 | <2 |

TABLE 3

DSC TESTING

| Material | Units | Example 10 (test 1) | Example 11 (test 2) | Example 12 (test 3) | Example 13 (test 4) | Example 14 (test 5) |
|---|---|---|---|---|---|---|
| PPHP | % | 75 | 72.5 | 66 | 75 | 62.5 |
| PPA | % | — | — | — | — | — |
| PEEK | % | — | — | — | — | — |
| MCF | % | 25 | 32.5 | 34 | — | — |
| CF | % | — | — | — | 25 | 27.5 |
| PTFE | % | — | — | — | — | 10 |
| Peak Max | °C. | 167.54 | 168.54 | 166.80 | 166.7 | 167.12 |
| Peak Onset | °C. | 160.28 | 163.12 | 160.68 | 160.14 | 162.0 |
| Heat of Fusion | Cal/g | 5.407 | 9.522 | 7.771 | 9.029 | 14.62 |

TABLE 4

| Material | Units | Example 15 (test 6) | Example 16 (test 7) | Example 17 (test 8) | Example 18 (test 9) |
|---|---|---|---|---|---|
| PPHP | % | — | — | — | — |
| PPA | % | 71 | 61 | — | — |
| PEEK | % | — | — | 78 | 68 |
| MCF | % | 29 | 29 | 22 | 22 |
| CF | % | — | — | — | — |
| PTFE | % | — | 10 | — | 10 |
| Peak Max | °C. | 318.93 | 326.88 | 344.05 | 329.71 |
| Peak Onset | °C. | 285.78 | 324.25 | 334.41 | 325.97 |
| Heat of Fusion | Cal/g | 6.653 | 3.887 | 5.096 | 3.885 |

TABLE 5

ABRASION TESTING

| Material | Units | Example 19 (test 1) | Example 20 (test 2) | Example 21 (test 3) | Example 22 (test 4) | Example 23 (test 5) |
|---|---|---|---|---|---|---|
| PPHP | % | 75 | 72.5 | 66 | 75 | 62.75 |
| PPA | % | — | — | — | — | — |
| PEEK | % | — | — | — | — | — |
| MCF | % | 25 | 27.5 | 34 | — | — |
| CF | % | — | — | — | 25 | 27.5 |
| PTFE | % | — | — | — | — | 10 |
| Number of Total Cycles | N/A | 5,000 | 5,000 | 5,000 | 5,000 | 5,000 |
| Normalized Change in weight per 500 cycles | mg/cm² | 0.06 | 0.06 | 2.66 | 0.06 | 0.16 |

TABLE 6

| Material | Units | Example 24 (test 6) | Example 25 (test 7) | Example 26 (test 8) | Example 27 (test 9) |
|---|---|---|---|---|---|
| PPHP | % | — | — | — | — |
| PPA | % | 71 | 61 | — | — |
| PEEK | % | — | — | 78 | 68 |
| MCF | % | 29 | 29 | 22 | 22 |
| CF | % | — | — | — | — |
| PTFE | % | — | 10 | — | 10 |
| Number of Total Cycles | N/A | 5,000 | 5,000 | 5,000 | 5,000 |
| Normalized Change in weight per 500 cycles | mg/cm² | 1.33 | 0.7 | 0.61 | 0.24 |

As apparent from Tables 1–6, the combination of MCF with PP including PPHP, PPA, or PEEK produces a composite material having improved abrasion resistive characteristics, a surface resistivity between $10^5$ to $10^9$ ohms/cm² and which may be used in injection molding to produce consistent parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reinforced abrasion resistive composite material comprising:
   a base resin selected from the group consisting of polyolefins, polyetheretherketone and polyamides, and a milled carbon fiber filler having an average fiber length of less than about 0.010 inches and an average fiber diameter between 0.0007 and 0.0009 inches, the base resin and milled carbon fiber filler combined in amounts sufficient to create the composite material being resistant to surface abrasion and having a surface resistivity between $10^5$–$10^9$ ohms/cm$^2$.

2. The composite material according to claim 1 wherein the base resin consists of polypropylene.

3. The composite material according to claim 1 wherein the base resin consists of polyphthalamide.

4. The composite material according to claim 1, wherein said base resin comprises a homopolymer selected from the group consisting of polyolefins and polyamides.

5. The composite material according to claim 1 and further including polytetrafluoroethylene (PTFE).

6. A reinforced abrasion resistive composite material for use in injection molding of devices used in the processing of semiconductor wafers comprising:

a homopolymer of polypropylene and milled carbon fiber filler having an average fiber length of less than about 0.010 inches and an average fiber diameter between 0.0007 and 0.0009 inches, said polypropylene and said milled carbon fiber filler being combined in amounts sufficient to create the composite material being resistant to surface abrasion and having a surface resistivity between $10^5$–$10^9$ ohms/cm$^2$.

7. A reinforced abrasion resistive composite material for use in injection molding devices used in the processing of semiconductor wafers comprising:

a homopolymer of polyphthalamide and a milled carbon fiber filler having an average fiber length of less than about 0.010 inches and an average fiber diameter between 0.0007 and 0.0009 inches, said polyphthalamide and milled carbon fiber filler combined in amounts sufficient to create the composite material being resistant to surface abrasion and having a surface resistivity between $10^5$–$10^9$ ohms/cm$^2$.

8. The composite material according to claim 7 further including polytetrafluoroethylene (PTFE).

* * * * *